March 6, 1951     D. E. LEONARD     2,543,915
PRODUCE TREATING APPARATUS

Filed Nov. 23, 1946     5 Sheets-Sheet 1

*INVENTOR.*
DAVID E. LEONARD
BY
*ATTORNEY*

March 6, 1951 — D. E. LEONARD — 2,543,915
PRODUCE TREATING APPARATUS
Filed Nov. 23, 1946 — 5 Sheets-Sheet 2

INVENTOR.
DAVID E. LEONARD

March 6, 1951

D. E. LEONARD 2,543,915

PRODUCE TREATING APPARATUS

Filed Nov. 23, 1946

INVENTOR.
DAVID E. LEONARD
BY
ATTORNEY

March 6, 1951 D. E. LEONARD 2,543,915
PRODUCE TREATING APPARATUS
Filed Nov. 23, 1946 5 Sheets-Sheet 4

INVENTOR.
DAVID E. LEONARD
BY
ATTORNEY

March 6, 1951     D. E. LEONARD     2,543,915
PRODUCE TREATING APPARATUS
Filed Nov. 23, 1946     5 Sheets-Sheet 5
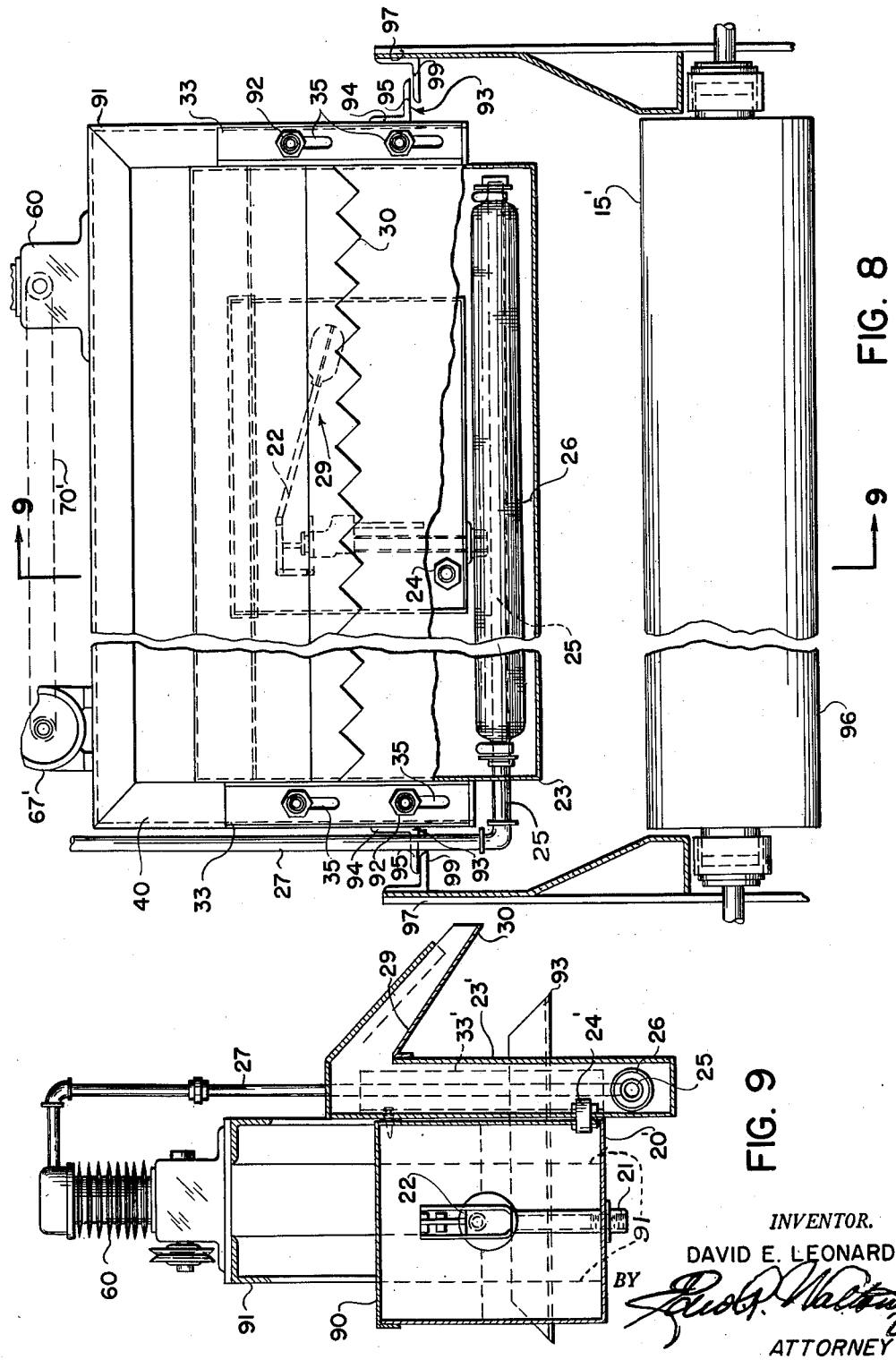
INVENTOR.
DAVID E. LEONARD
ATTORNEY Patented Mar. 6, 1951

2,543,915

UNITED STATES PATENT OFFICE 2,543,915

PRODUCE TREATING APPARATUS

David Elwyn Leonard, Orlando, Fla., assignor to American Machinery Corporation, Orlando, Fla., a corporation of Florida Application November 23, 1946, Serial No. 711,911

4 Claims. (Cl. 91—25)

This invention relates to produce-treating equipment and, more particularly, to improvements in apparatus, as shown and described in U. S. Letters Patent No. 2,430,187 for applying a thin, uniform and polished film, such as wax, to the surfaces of produce.

The object of the present invention is to provide an apparatus, as mentioned, that admits of a more uniform control of the coating material delivered to the produce being treated and that is economical in construction and use for the commercial purposes.

The foregoing and other objects ancillary thereto are preferably accomplished, in accordance with a preferred embodiment of the invention, by a unitary structure including a sudsing apparatus and buffing mechanism adapted for attachment to any produce-treating machine. Specifically, the sudser comprises a suitable source of solution, such as a supply tank, which is arranged to feed into a control tank that is adapted to maintain a predetermined solution level in a mixing or sudsing tank with which it is in communication. The sudsing tank is relatively narrow but is sufficiently long to extend the full width of a standard produce-treating bed. A perforated airline extends along the bottom of the mixing or sudsing tank and this airline is surrounded by a fabric sock which acts to separate the air, that is forced through the airline, into small bubbles and to diffuse or disperse these bubbles through the solution within the mixing tank. This action aerates the solution which causes it to foam or suds-up and overflow the tank to a delivery chute for directing the suds down onto the produce below. The sudsing apparatus may be formed as a unit which may be applied directly to a brush bed machine or be mounted upon a frame that supports a buffing mechanism overlying the machine bed, and which supporting frame is vertically adjustable relative to the machine bed and upon which may be mounted an air compressor to supply air to the mixing tank and a motor for driving the compressor.

The buffing mechanism, as disclosed in said patent, is preferably in the form of a plurality of rag rollers which comprise a plurality of canvas strips extending radially from a supporting shaft. In the present improvement, these rollers are removably journaled on a separate frame as above mentioned which telescopes around a side-enclosing-housing or hood which is slotted to accommodate the buffer shafts and which may be attached directly to any produce-treating machine. This arrangement permits the adjustment of the buffers relative to the treating bed in order to regulate the wiping and buffing effect and to accommodate produce of different sizes. The sudsing apparatus is adjustably mounted on the supporting frame of the buffing mechanism in order that it (1) may be adjusted to a position that is substantially level along the length of the suds feed chute, (2) may be tilted so as to vary the inclination of the feed chute, and, (3) may be variably spaced, relative to the frame, so as to position the feed chute to drop the suds directly upon the produce or onto the buffers which in turn apply them to the produce.

In a modification wherein the produce is conveyed upon a treating bed formed by roller brushes, the sudsing apparatus may be assembled as a unit with the compressor and the motor, and this unit may be adapted for mounting upon the treating machine. In still another modification, the motor may be replaced by a drive shaft which may be driven by the power equipment for the treating machine, as by means of a belt, a chain or the like, thus eliminating the duplication of power equipment, but without departing from the spirit of the invention.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout and in which:

Fig. 8 is a front view in elevation of a modified form of sudsing unit; and

Fig. 9 is a cross sectional view taken on line 9—9 of Fig. 8.

Figure 1:
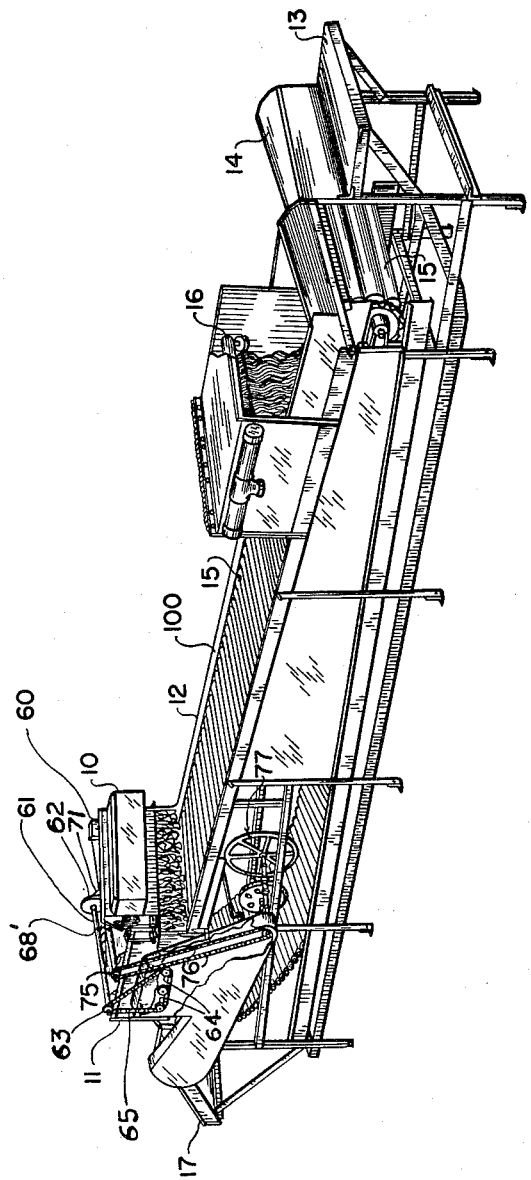
Fig. 1 is a view in perspective of a produce-treating machine having a unitary sudsing and buffing apparatus mounted thereon in accordance with the present invention.

An apparatus of the present type should have the distinct characteristics of comprising an independent unitary structure that may be readily assembled or disassembled with any desired treating machine and which is capable of supplying a predetermined amount of film-forming material in an economical manner by means of a sud or foam, and is adapted for varying the wiping and buffing effect upon the produce in accordance with the texture and thickness of film desired. Accordingly, an embodiment of the invention, referring to Figs. 1 and 2 of the drawings, is constituted by a sudsing equipment 10 that is combined as a unit with a buffing mechanism 11 and is adapted for mounting upon any desired type of produce-treating machine 12. The produce-treating machine shown in the drawings comprises a table 13 upon which boxes or baskets of produce may be rested prior to feeding to the machine, an inclined slat dump 14 upon which the produce may be dumped and between the slats of which dirt, rubbish, and immature produce may drop and be eliminated, an endless conveyor 15, which in the present instance is in the form of a roller-belt conveyor, a spray-type washer 16 through which the produce is carried by the conveyor so that loose dirt may be washed therefrom, a grading space 160 over which the produce is carried by the conveyor while operators pick undesirable produce therefrom and at the upper end of which is positioned the sudsing and buffing unit 10—11, and a supply chute 17 for feeding the processed produce from the conveyor 15 to any desired type of collector such as a picking table or hamper.

Figure 4:
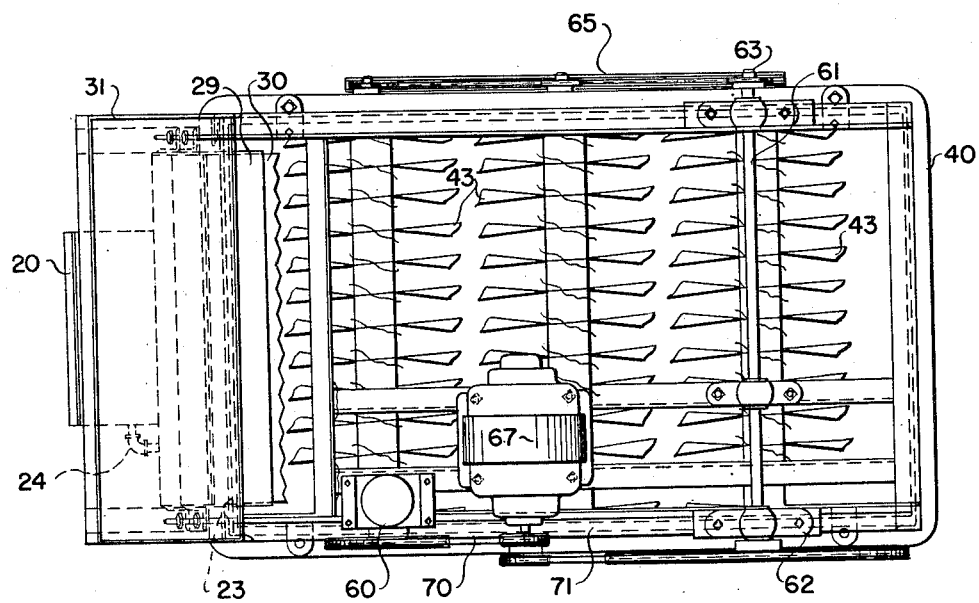
Fig. 4 is a top plan view of the unit shown in Fig. 3.
Figure 3:
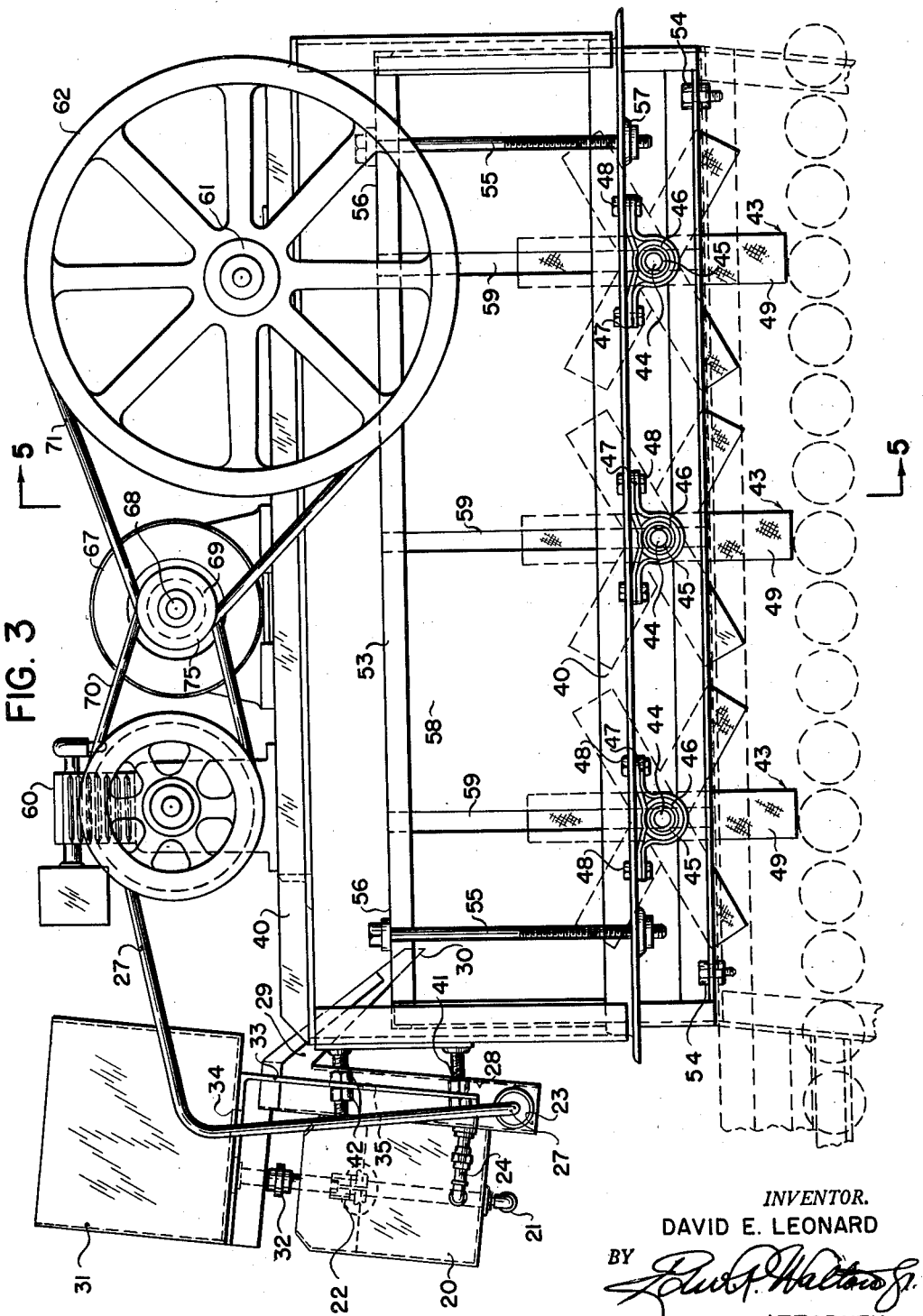
Fig. 3 is a side view in elevation of the preferred form of sudsing and buffing unit.
Figure 5:
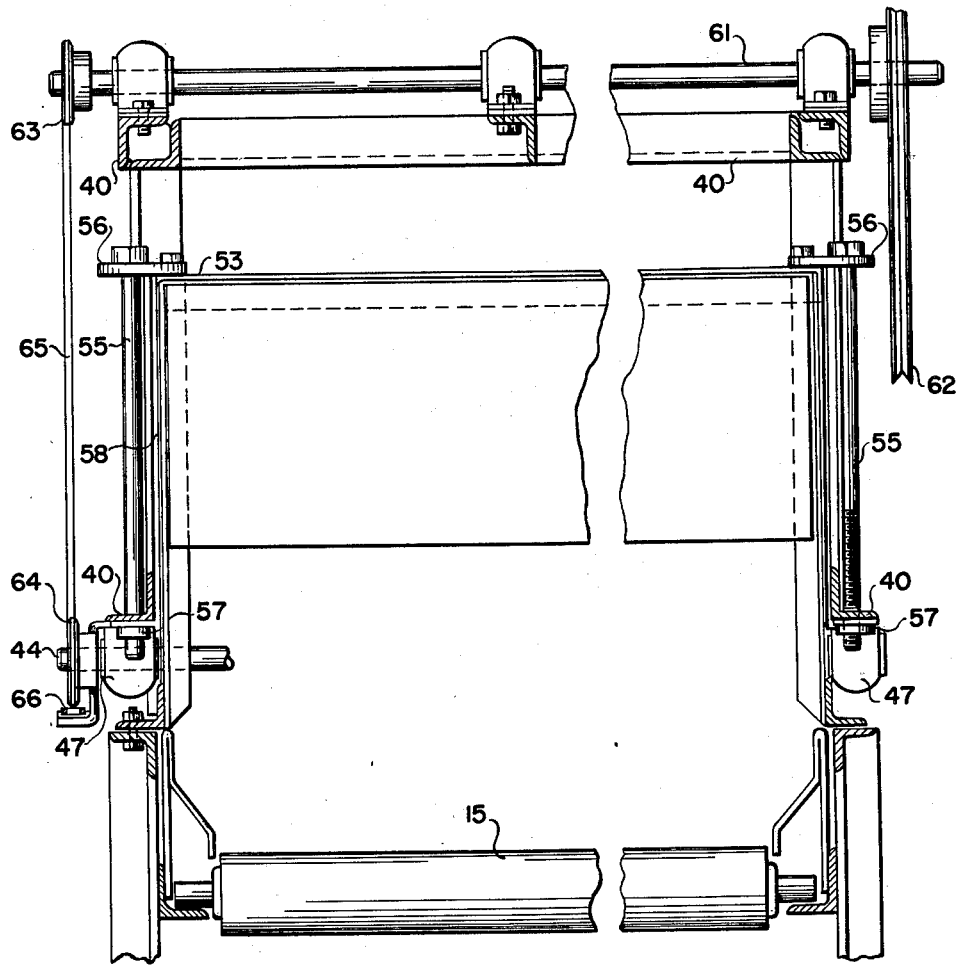
Fig. 5 is a cross sectional view taken on line 5—5 of Fig. 3.

The sudsing and buffing equipment, best shown in Figs. 3 and 4, comprises a control tank 20 having an inlet 21 and a control valve 22 for admitting a predetermined supply of liquid to the tank 20. The control valve 22 may be of any desired type that will render accurate control and preferably is in the form of a simple float valve, although a needle valve or other adjustable positive means may be employed. The control tank 20 is mounted in fixed relation with the mixing tank 23 and is placed in communication therewith by a suitable connection 24, such as an elbow pipe. The mixing tank 23 is a relatively narrow tank that is arranged to extend the full width of the apparatus and is somewhat taller than the control tank. An airline 25 is positioned in the bottom of the mixing tank 23 and extends substantially the full length thereof, as best shown in Fig. 8. The airline 25 may be in the form of a perforated tube and is surrounded by a canvas sock 26, and is connected with an air supply line 27. Accordingly, when air is supplied under pressure, through the line 27 to the perforated pipe 25, the air is expelled in small streams into the sock 26 and through the sock into the solution in the tank 23. The sock 26 causes the air to break up into fine bubbles that are dispersed or diffused through the liquid and has the effect of carbonating or aerating the liquid which causes it to foam up within the tank 23 to form suds.

The wall 28 of the mixing tank 23 terminates somewhat short of the top of the tank and is formed over with a downwardly inclined chute 29 having serrated, notched or fluted edge 30 to evenly distribute the suds across the full width of the treating area.

The solution or emulsion may be supplied to the control tank 20 from any suitable source but in the preferred form a supply tank 31 is mounted immediately above the control tank 20 and is connected with the inlet 21 by a supply line 32. In order to assemble the whole structure as a unit, the control tank 20 and the mixing tank 23 may be formed as an integral unit or may have their adjoining walls secured together. A pair of vertical brackets 33 may be attached, one to opposite ends of the mixing tank 23, and have arms 34, extending angularly from their upper ends, upon which the supply tank 31 may be mounted. In addition to supporting the tank 31, the brackets 33 also act as supports for the sudsing equipment combined structure and, to this end, are provided with pairs of vertical slots 35, as best shown in Fig. 8, for receiving suitable mountings, such as stud bolts 41 or the like, projecting from each side of a buffer-supporting frame 40 and secured thereto by pairs of lock nuts 42, which may be adjusted to position the brackets 33 at the desired height and at the desired angle for controlling the even distribution and amount of flow of the suds from the mixing tank 23 to the chute 29 and at the desired spacing relative to the frame for controlling the dropping of the suds relative to the buffers.

Figure 6:
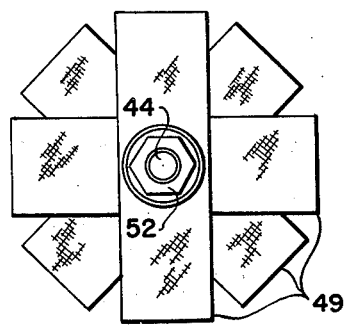
Fig. 6 is an end view in elevation of the preferred form of buffing element.
Figure 7:
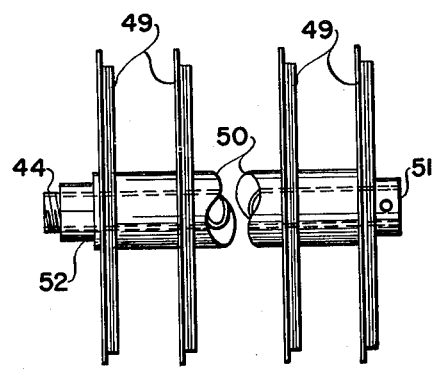
Fig. 7 is a side view in elevation of the preferred form of buffing element.

The buffer mechanism may comprise a plurality of wiping, buffing or polishing elements 43 removably mounted on the lower side members of the frame 40 so that different types of elements may be inserted as desired to permit versatility of use. These elements 43 comprise shafts 44 having bearings 45 journalled in expansible bearings 46 supported by clamps 47 removably secured to the frame 40 by bolts 48. Three of these assemblies are shown in the drawings, but it will be understood that any desired number of the elements 43 may be employed. In the preferred form, the elements 43 comprise wiping or buffing members formed by a plurality of radially disposed canvas strips, as best shown in Figs. 6 and 7. These elements comprise canvas strips 49 perforated centrally thereof so as to fit over their shaft 44. The strips 49 are preferably mounted in groups of four that are positioned about the shaft 44 at 45° relative to each other and the groups are clamped together and spaced from each other by collars 50. A fixed collar 51 is positioned on one end and a nut 52 is threaded on the other end of the shaft 44 to clamp the groups of strips and the collars tightly together. This structure forms a rag roller that is soft and flexible and produces an excellent wiping and buffing action but does not become clogged, caked or matted with wax. Furthermore, the structure is such that the elements may be refurbished by the operator simply by removing the nut 52 and replacing the cloth strips 49 which the operator may cut from any piece of cloth.

The frame 40 is telescopically supported by a housing or shielding member 53 adapted to be mounted upon any desired type of produce-treating machine above the treating bed 15 thereof. The housing 53 may be secured to the machine in any desired manner, as by bolts 54 or other suitable means. The housing 53 is designed to prevent splattering or throwing of the suds, but its bottom is open as may be its top. In the preferred form, the frame 40 fits around the outside of the housing 53 and is suspended from the top of the housing by means of hanger bolts 55 supported from the brackets 56 secured to the top edges of the housing and extending through the lower side members of the frame 40. Thus, by adjusting the nuts 57 on the bolts 55, the frame 40, with the elements 43, will be raised or lowered relative to the housing 53 and the treating bed 15 in order to regulate the thickness and type of film formed on the produce according to the extent of the wiping or buffing pressures and also in order to accommodate produce of different graded sizes. As the frame 40 is preferably outside of the hood 53, the side walls 58 of the housing 53 are provided with vertical slots 59 to accommodate the shafts 44 of the elements 43. It will be understood that, if desired, the sudsing equipment 10 may be removed or its operation discontinued and the adjustably mounted buffing mechanism 11 may be employed as a separate unit.

In order to complete the unitary structure of this equipment, the necessary power equipment is supported on top of the frame 40. This power equipment comprises an air pump or compressor 60 that is connected with the air supply line 27 for feeding air into the mixing tank 23. The power equipment also comprises a drive shaft 61 including a fly wheel 62 and a drive sprocket 63 for driving the sprockets 64 of the elements 43 by means of a chain 65. The chain 65 meshes with the bottoms of the sprockets 64 and is retained in engagement by a slideway 66. In addition, the power equipment comprises a unitary source of power and is mounted on the frame 40 for driving both the compressor 60 and the drive shaft 61. As shown in Figs. 2 through 4, this source of power may be in the form of a suitable engine or motor 67 upon the shaft 68 of which may be mounted suitable drive means, such as pulleys 69, which may be connected to drive the compressor 60 and shaft 61 by means of belts 70 and 71, respectively. In a modified form of the invention, shown in Fig. 1, the unitary source of power may be in the form of a power shaft 68' which may be driven by means of a sprocket 75 and chain 76 by the power unit 77 of the treating machine 12. In this modification, a single source of power is employed for operating the treating machine and the sudsing and buffing equipment.

In still another modification of the invention, the sudsing equipment is adapted as a unitary structure for use with machines comprising beds formed of rotated brushes and with which the buffers are not necessary. This structure is best shown in Figs. 8 and 9 and is very similar to the hereinbefore described sudsing equipment, although slight modifications are shown to illustrate variations contemplated as being within the scope of invention. The control tank 20' and the mixing tank 23' are formed in substantially the same manner except that a communicating opening 24' is formed directly between the two tanks in lieu of the outside elbow connection 24 shown in the previously described modification. The control tank 20' may be provided with an inlet 21 and a control valve 22 and the mixing tank 23' may be provided with a perforated airline 25 which is surrounded by a canvas sock 26. Whereas the previously described control tank 20 may be open at the top due to the fact that it is protected by the superimposed supply tank 31, the control tank 20' is provided with a hinged cover 90 because, for purposes of illustration, a separate source of supply is substituted for the self-contained tank 31.

Supporting brackets 33' are mounted on the ends of the mixing tank 23' and these brackets differ only in that they do not have the arms 34 for supporting a supply tank 31 in view of the fact that a separate source of supply is employed in the present instance. The brackets 33' are secured to an inverted U-shaped frame 91 by bolts 92 carried by the frame 91 and extending through the slots 35 in the brackets 33'. These bolts 92 are shown as being ordinary bolts that clamp the brackets directly to the surface of the frame 91, but it will be understood that the fixed bolts 41 may be substituted therefor. A compressor 60 and motor 67' may be mounted on the top of the frame 91 and drivingly connected by belt 70'. The motor 67' may be smaller than the motor 67 in view of the fact that its load comprises the compressor 60 only, and not the buffing mechanism. The compressor 60 may be connected with the supply pipe 27 for feeding air to the mixing tank 23'.

The frame 91 is adapted for positioning on a treating machine by means of angle members 93 which are fixed in a horizontal position by attaching their vertical flanges 94 to the outsides of the lower ends of the frame 91 so that their horizontal flanges 95 extend laterally to form supporting brackets for cooperating with the superstructure of the produce-treating machine. In the structure shown in Fig. 8 the treating bed 15' is formed by a plurality of rotatably mounted brushes 96 which spread and polish the emulsion supplied to the produce and thereby form an unbroken film. The treating bed 15' is confined by the sidewalls 97 of the machine and angle brackets 99 are fixed to the inner sides of the sidewalls to form supports for the frame-supporting flanges 95 of the brackets 93. This modification forms a compact, self-contained suds-producing unit that may be employed with machines of the brush type and with which the buffing elements are unnecessary.

In view of the foregoing description, the operation of the invention should be readily evident. A review of the process, however, will be in order to properly emphasize its distinguishing characteristics and advantages. To start with, the sudsing equipment, a suitable supply of wax emulsion or other desirable type of liquid or solution may be provided in the supply tank 31, in the modification shown in Fig. 3, or from a suitable separate source, in the modification shown in Figs. 8 and 9. In either instance, the liquid is supplied through the inlet 21 to the control tank 20, or 20', in quantities regulated by the adjustable control valve 22. The control tank 20, or 20', being in communication with the mixing tank 23 or 23', by means of the connection 24, or 24', the control of the liquid level in the control tank acts to maintain the liquid at the same level in the mixing tank 23, or 23'.

Air under pressure is supplied in the bottom of the mixing tank and throughout the length thereof by a perforated airline 25 and through a fabric tube or sock 26 which surrounds the airline and divides the air into small bubbles before it is diffused or dispersed through the liquid in the mixing tank. The introduction of the air into the liquid transforms the liquid into a foaming or sudsy mixture to thereby materially increase it in volume with a consequent decrease in density. This produces a thin, light, medium for application to the produce, that is capable of forming a thin, unbroken film of uniform thickness. The foaming of the mixture causes it to rise in the mixing chamber and to flow over the lower edge, of a wall 28, of the chamber to spill down the feed chute 29 which distributes it over the produce under treatment.

The mixing chamber is relatively narrow so that the one airline will be sufficient to aerate all of its contents and so that the mass will be so confined that it will readily foam up to overflow. As it is imperative that the suds be distributed evenly across the width of the treating bath, the sudsing equipment is assembled as a unit which may be adjustably supported by brackets 33, or 33', in order that it may be properly leveled even though the treating machine upon which it is mounted is not level. The supporting brackets 33, or 33', provide the additional advantage of permitting the sudsing equipment to be tilted to raise or lower the feed chute 29 to regulate the flow of the suds and also permitting the spacing of the equipment, both horizontally and vertically, relative to its supporting structure.

Figure 2:
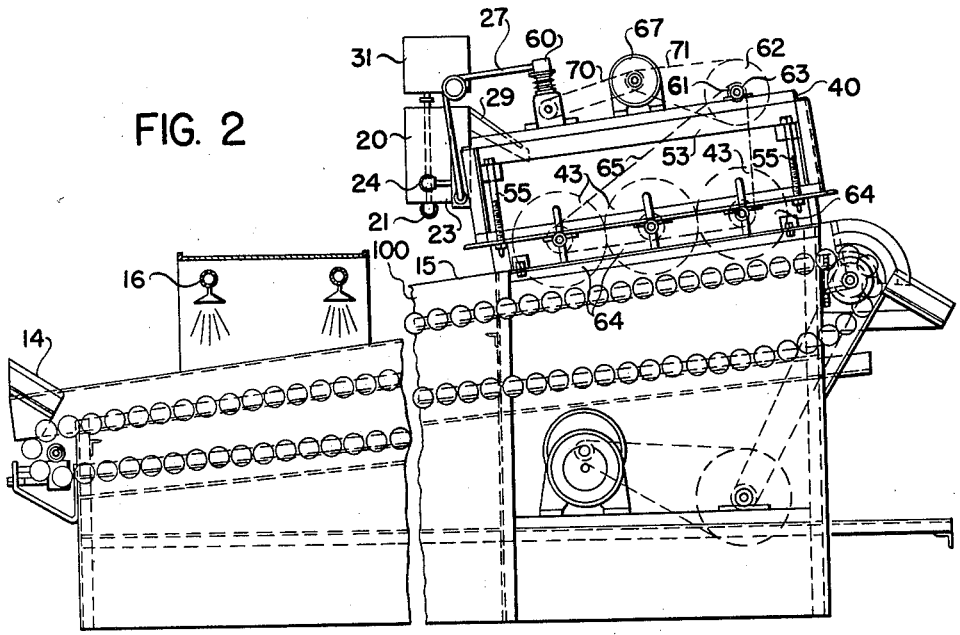
Fig. 2 is a side view in elevation of the machine shown in Fig. 1 with the preferred form of sudsing and buffing unit mounted thereon.

The sudsing equipment may be employed separately in conjunction with brush type treating machines, such as shown in Fig. 8, or it may be combined with a buffing mechanism, as shown in Figs. 1 and 2, which may evenly and lightly buff the suds on the produce into a thin, unbroken film.

The frame 40 is not mounted directly upon the treating machine, but is supported by and around a housing 53 that is mounted on the machine. The frame 40 is suspended on hanger bolts 55 which are hung from the top of the housing 53. This telescopic arrangement permits adjustment of the frame 40 to raise or lower the buffing elements 43 in order to accommodate produce of different sizes or to regulate the pressure applied upon the produce.

Although certain specific embodiments of the invention have been shown and described, it is obvious that many modifications thereof are possible. The invention, therefore, is not to be restricted except insofar as is necessitated by the prior art and by the spirit of the appended claims.

That which is claimed, as new, is:

1. In a device for supplying a foamed treating liquid to edible produce as it is conveyed on an underlying treating bed said device comprising a foam producing apparatus including a mixing or foaming chamber, a feed chute extending from the upper portion of the chamber and adapted to extend substantially across the treating bed to deliver foam from the chamber onto the produce being treated, a perforated airline in the lower portion of the chamber for aerating the liquid therein and to transform said liquid into a foam, the improvement consisting of an inflatable fabric tube surrounding the airline to finely divide the air before it is dispersed into said liquid and a supporting frame means adapted to support said apparatus above the treating bed and including adjustable means for maintaining said apparatus on said frame in adjustable positions, said adjustable means being operable to level horizontally or tilt vertically said chute relative to the treating bed to regulate the amount and evenness of the flow of foam to the treating bed.

2. A device for attachment to machines having a treating bed for edible produce and for applying a film to said produce, said device comprising a splash shield adapted to be mounted upon said machine above said treating bed, a frame disposed above said treating bed, rotatable buffing elements journalled in said frame to engage the produce being treated on the bed, means supporting the frame from said splash shield and adjustable vertically to space said buffing elements relatively to said treating bed to regulate the action of said buffing elements on said produce, a liquid foaming apparatus carried by said frame, a feed chute extending from said apparatus and positioned to deliver foam therefrom onto the produce on the treating bed and in advance of said buffing elements, and adjustable means between said frame and said apparatus for varying the angular positions of said chute whereby the amount and evenness of distribution of said foam delivered to the treating bed may be regulated.

3. A device for treating produce, such as fruits and vegetables, and which comprises a splash-shield adapted for mounting upon the top portion of a produce-treating machine having an underlying treating bed therein, hanger bolts suspended from said shield, a frame telescopically disposed with respect to said shield and adjustably supported by said hanger bolts, rotatable buffing elements removably journalled on said frame, a liquid foaming apparatus, brackets attached to said apparatus, adjustable means on said frame for removably supporting said brackets in angularly adjusted positions, and a feed means extending from one side of said apparatus and disposed to deliver suds therefrom onto the produce on the treating bed in advance of said buffing elements.

4. A device for treating produce, such as fruits and vegetables, and which comprises a splash-shield adapted for mounting upon the top portion of a produce-treating machine having an underlying treating bed, a frame telescopically disposed with respect to said shield, means adjustably supporting said frame from said shield for adjustment to and from said treating bed, rotatable buffing elements journalled in said frame to contact with the produce being treated on and supported by said treating bed, a dispensing apparatus for material with which the products are treated, means on said frame for supporting said apparatus in adjusted positions relative to said treating bed, and a distributing means receiving dispensed liquid from said apparatus to deliver said liquid on to the produce on the treating bed.

DAVID ELWYN LEONARD.

REFERENCES CITED

The following references are of record in the file of this patent:

UNITED STATES PATENTS

| Number | Name | Date |
|---|---|---|
| 860,078 | Binks | July 16, 1907 |
| 1,608,896 | MacIntosh | Nov. 30, 1926 |
| 1,700,908 | Ricketts | Feb. 5, 1929 |
| 1,755,614 | Seil | Apr. 22, 1930 |
| 2,430,187 | Recker | Nov. 4, 1947 |